| United States Patent Office | 2,976,263
Patented Mar. 21, 1961 |
|---|---|

2,976,263

SOLID STATE POLYMERIZATION

Yun Jen, Anaheim, Calif., and Janet L. Johnson and Romeo R. Aloia, New Brunswick, N.J., assignors to American Cyanamid Company, New York, N.Y., a corporation of Maine No Drawing. Filed Jan. 6, 1959, Ser. No. 785,113

4 Claims. (Cl. 260—72)

The present invention relates to the preparation of solid polymers. More particularly, the invention relates to a method of making homopolymers of acrylamide and copolymers thereof with acrylic or methacrylic acid which are solid at temperatures above about 35° C. by polymerizing the monomers in the solid state, i.e., conducting the polymerization in a liquid medium which is a nonsolvent for both the monomers and the resulting polymer. The present invention is particularly advantageous for the polymerization of solid crystalline acrylamides although the process may also be utilized with other monomers which are available as solids at room temperature. The term "acrylamides," as employed in the present invention, includes acrylamide, methacrylamide, methylol acrylamide and mixtures thereof.

The polymerization system of the present invention provides certain definite advantages over the procedures known and generally utilized by the prior art. For example, it avoids overheating during the polymerization of monomeric compounds such as takes place in bulk polymerization systems and avoids drying and recovery problems such as takes place in solution polymerization systems.

The advantages of a solid state polymerization system have been set forth in the copending application of Thomas and Friedlander, Serial No. 645,026. Polymerizations via such a system have a number of definite advantages. For example, in a system of this kind, the viscosity is independent of the molecular weight. Therefore, the system need not be limited to relatively low concentrations as in solution methods; when high molecular weight polymers are prepared, the dependence of the molecular weight of the product on the concentration of the initiator is lessened; and in particular the present nonsolvent system produces the polymer as a powdery, easily recoverable, readily dried product.

The disclosure in that copending application, Serial No. 645,026, teaches that solid polymer of the water-soluble variety may be prepared wholly in the solid state from solid monomers such as acrylamide, without dissolving the monomer, by reacting the monomer preferably with catalyst, in a medium which is nonsolvent for both monomer and polymer. In the system as described in this pending application, it has been found that during the polymerization reaction there is a tendency for the polymer to coagulate and adversely lowering the molecular weight and uniformity of the physical condition of the product, each of which lessens substantially the usefulness as well as commercial attractiveness of the polymer. Coagulation of the polymer as it is formed, moreover, makes efficient stirring of the system difficult and greatly retards heat removal from the system.

According to the present invention, we have discovered that a marked improvement in molecular weight and physical size of the powder product as well as a more efficient system may be obtained by the introduction into the system of small amounts of preformed solid polymer, preferably of the same chemical composition as the polymer which it is desired to produce.

It is an object of the present invention to prepare, via the solid state reaction and at an improved uniformity of molecular weight and product size, water-soluble polymers from the corresponding water-soluble monomer. It is a more particular object of the invention to provide a means for improving the efficiency of the polymerization system by introducing a small amount of preformed solid polymer into the polymerization system in the preparation of a water-soluble polymer in a solid state polymerization system. Other objects and advantages will become apparent as the description of the invention proceeds.

Generally stated, the invention resides in adding to the polymerization system a small quantity of solid polymer of the kind being prepared from monomer during the course of the polymerization and preferably at the beginning of the polymerization reaction. The system with which the invention is concerned is that of the aforementioned copending application wherein a solid crystalline vinyl monomer is suspended in a nonsolvent for the monomer and reacted at a temperature below the melting point of the solid monomer. As polymerization of the solid monomer occurs, the polymer is produced also in the solid state. Initiation preferably takes place by the addition of a catalyst as the source of free radicals. The polymer produced according to the invention may be a homopolymer of an acrylamide monomer as above specified or it may be a copolymer with acrylic or methacrylic acid in which acrylamide is present in major amounts and preferably a copolymer in which the acrylamide-acrylic acid weight ratio is not less than 7:3, respectively, i.e., wherein at least 70% by weight acrylamide is present.

The preformed polymer is introduced into the system in "seed" quantities to promote uniform polymerization. The "seed" ploymer should preferably have the same chemical composition as the polymer which it is desired to produce, although it may differ, as heretofore noted. The most convenient method of "seeding" involves adding a small amount, e.g., from about 0.5 to 15% of a previous batch to a subsequent polymerization. The word "seed" is used herein to connote that the amount of powdered polymer added is small and that it is insoluble in the reaction mixture.

In selecting a polymerization catalyst for use in the present invention, it is preferred that such compounds be oil-soluble to some extent. Suitable catalysts which have found utility are organic peroxides and hydroperoxides of acids having at least 4 carbon atoms, and azo compounds having the formula:

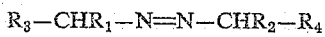

$$R_3-CHR_1-N=N-CHR_2-R_4$$

wherein $R_1$ and $R_2$ are substituents selected from the group consisting of alkyl radicals having at least 3 carbon atoms and aralkyl radicals, and $R_3$ and $R_4$ are substituents selected from the group consisting of hydrogen, alkyl radicals, preferably those containing up to 20 carbon atoms, phenyl radicals, aralkyl radicals, alkoxy radicals, furyl radicals, cyano radicals and halogen substituted radicals of said group. Illustrative specific examples of such compounds are cumene hydroperoxide, tertiary-butyl hydroperoxide, ditertiary-butyl peroxide, toluyl hydroperoxide, benzoyl peroxide, p-bromobenzoyl hydroperoxide, succinyl peroxide, pinane hydroperoxide, acetyl peroxide, p-methane hydroperoxide, methyl ethyl ketone peroxide, diisopropylbenzene hydroperoxide, anisoyl peroxide, 1-cyclohexanol-1-hydroperoxide, furoyl peroxide, and the like. Suitable illustrative examples of azo catalysts are such as Porofor N azo-bis(isobutyronitrile), azo-bis(diphenyl methane), 1,1-azo-bis(1-phenyl ethane), 1,1'-azo-bis(1-phenyl hexane), azo-bis(naphthyl cyclohexyl methane), azo-bis(ditolyl ethane), 1,1-azo-bis-(chlorophenyl ethane), 1,1 - azo - bis(dimethoxyphenyl methane), azo-bis - 1 - (2-furyl)isobutane, azo-bis-α-(2-furyl)chlorophenyl ethane, azo-bis-α-(2-furyl) toluyl ethane and the like. Organic redox catalyst systems such as the benzoyl peroxide-dimethyl aniline system may also be employed. The amount of catalyst may vary over a fairly wide range. Thus, from about 0.05% to about 5% by weight based on the total weight of the polymerizable compounds may be used and generally amounts of from about 0.2% to about 3% by weight are preferred as a practical matter.

The initiation of the polymerization after the addition of the catalyst to the reaction mixture is frequently attended by a marked increase in temperature and care must be taken to remove the excessive heat generated in such cases. The total quantity of catalyst may be added initially to the reaction mixture or in small proportions during the course of polymerization. The latter method affords a convenient procedure for regulating the amount of heat produced in a given time.

As noted, the polymer which is formed is itself insoluble in the liquid medium permitting the solid polymer to be filtered off and dried to a free-flowing powder. The process provides a marked processing advantage, inasmuch as the cumbersome time-consuming materials handling problem of isolating from solution or from an emulsion is avoided and all that is required is a simple decantation and air drying.

Various non-aqueous liquid compounds which may be utilized as the medium in producing the polymers according to the present invention are moderately volatile materials, preferably having a boiling point of between about 50° C. and 200° C. Among the more suitable liquid substances are the linear chain saturated hydrocarbons containing from 5–12 carbon atoms, for example, hexane, pentane, octane, heptane and their mixtures. Substituted liquid hydrocarbon nonsolvents, and various other compounds, such as carbon tetrachloride, octyl chloride, chlorinated benzene, Nujol, which is a commercially available hydrocarbon mineral oil, may also be employed. Suitable liquids, of which the above are exemplary, are those which have the following properties: do not dissolve either the monomer or polymer; are nontoxic and inexpensive; do not substantially lower the molecular weight, i.e., are poor chain transfer agents; are volatile and therefore easily removable; and do not have a substantial swelling effect on either monomer or polymer.

Various dispersing agents may be incorporated into the polymerization system, although the use of such materials forms no part of the present invention. The use and advantages of dispersing agents in the solid state system is described and claimed in a copending application in the name of Jen and Johnson, filed concurrently herewith. Suitable dispersing agents which may be used are alkyl esters of alkali metal sulfosuccinic acid salts such as diisobutyl sodium sulfosuccinate, known as Aerosol IB, dihexyl ester of sodium sulfosuccinic acid, known as Aerosol MA, dioctyl ester of sodium sulfosuccinic acid, known as Aerosol OT, N-octadecyl disodium sulfosuccinate, diheptyl ester of potassium sulfosuccinic acid, N-octadecyl tetrasodium (1,2-dicarboxyl) ethyl sulfosuccinamate, diamyl lithium sulfosuccinate, bistridecyl sodium sulfosuccinate, available as Aerosol TR, and the like. In the aforementioned Jen et al. application, the use of a small quantity of water in the system is also described and claimed. Although minor quantities of water may likewise be introduced into the system of the present invention, the procedure wherein minor amounts of water are used forms no part of the instant invention.

The quantity of polymer introduced into the system may vary over fairly wide limits, but should not exceed about 20% based on the weight of the monomer. Preferably, amounts of polymer from about 0.5% to about 15% are most suitably employed in the form of a finely granulated or powdered solid material. We have discovered that the introduction of this small amount of polymer into the system helps remarkably in maintaining homogeneity in the reaction system by facilitating agitation of the reaction mixture and uniform dissipation of heat of exotherm. The product derived is markedly improved in uniformity and is in the form of a free-flowing readily water-soluble product which may be usefully employed for various applications, such as surface coatings, paper or fiber treatment and other uses hereafter more fully set forth.

The following examples in which the parts are parts by weight are set forth for the purposes of illustration only and any specific enumeration of details should not be interpreted as a limitation except as expressed in the appended claims.

EXAMPLE 1 (CONTROL)

Twenty-five parts of acrylamide, 322.5 parts of n-heptane, 7.5 parts of Aerosol OT, the dioctyl ester of sodium sulfosuccinic acid, and 0.013 part of azo-bisisobutyronitrile, available as Porofor N, were charged to a reaction vessel. Nitrogen was passed into the reaction mixture throughout the entire operation. The temperature was raised to 70° C. and an effort was made to maintain this temperature for one hour, while stirring. The appearance of agglomerates of polymer as the reaction progressed hindered efficient stirring and heat removal. Moreover, because of formation of agglomerates, the reaction was irregular and the temperature varied between 63° C. and 78° C. The reaction product was filtered and washed with acetone. The air dried product was white powder, soluble in water completely. The conversion was 91%. The molecular weight of the polymer is approximately 0.9 million by viscosity determination.

EXAMPLE 2

The procedure of Example 1 is repeated with the exception that 2 parts of solid powdered polyacrylamide is introduced into the system. No lumps or agglomerates formed and the temperature was easily maintained (70° C.±1° C.) throughout the reaction. The conversion was 93% and the molecular weight is approximately 1.3 million.

EXAMPLE 3

The following illustrates a semi-continuous polymerization run of acrylamide.

Fifty parts acrylamide, 650 parts n-heptane, 15 parts Aerosol OT, 4 parts polyacrylamide and 0.026 part Porophor N, azobisisobutyronitrile, were charged to the reactor. Nitrogen was passed into the reaction mixture throughout the entire operation. The reaction was carried out at 70° C. At the end of one hour, a mixture, equal in weight to one-half (½) the above charge was removed. Then, to the reactor was charged 25 parts acrylamide, 322.5 parts n-heptane, 7.5 parts Aerosol OT, and 0.013 part Porophor N, azobisisobutyronitrile as catalyst.

This operation was repeated every hour over a period of five hours. All the polymer was recovered by filtration, washing with acetone and air dried.

The over-all yield of the polymer was 100%, with an average reduced viscosity of 4.9 measured at 0.25% solid in 1 N NaNO$_3$ at 30° C.

EXAMPLE 4

43.4 parts of crystalline powdered acrylamide and 7.7 parts of acrylic acid were suspended in a suitable reaction vessel containing 510 parts hexane to which had been added 39 parts of a 25% solution of Aerosol TR in hexane and 3.4 parts of powdered polyacrylamide. 0.13 part of 90% pure benzoyl peroxide dissolved in 1.5 parts of benzene was introduced into this preparation. The mixture was heated to 70° C. for 15 minutes, 2 parts of water was added and the temperature maintained at 70° C. for one hour. The copolymer formed was filtered from the hexane and was washed free of hexane and unreacted monomers with acetone and the product dried. The conversion was 87%. A 1% solution of the dried product imparted excellent dry strength to paper when introduced as a beater additive into the pulp during manufacture. Although polyacrylamide is introduced as the polymeric component in the above example, it will be apparent that a copolymer of acrylamide-acrylic acid or a homopolymer of acrylic acid may likewise be substituted therefor.

EXAMPLES 5–10

The following examples, the results of which are summarized in Table I, further show the advantages of introducing small amounts of polymer into the polymerization system. The procedure employed is substantially that followed for Example 3. The polymer ingredient or "seed" quantity of polymer in Examples 5, 7 and 9 is of the same chemical composition as that of the monomer being reacted derived from earlier batches. Examples 6, 8 and 10 are comparative examples in which the small amount of preformed polymer is omitted.

initiating catalysts (including actinic light or heat alone) and which are insoluble in a suitable medium may be utilized in practicing the present invention. Included but not exclusive are preferably such monomers as acrylamide, methacrylamide, alone or copolymerized with acrylic acid, or methacrylic acid and the various salts of these acids such as potassium, calcium, and barium acrylates.

The advantages of the present invention will be immediately apparent to those skilled in the art from the foregoing description. The invention provides a useful and highly practical method of producing polymeric material; it avoids the presence of a solvent which must be removed; makes the resulting compositions suitable in applications for which aqueous solutions of polyacrylamide would be entirely unsuited; and it provides not only high conversion but desirable high molecular weight material.

As a result of the present invention, all of the inherent advantages of a non-aqueous solvent can be utilized in working with polymers and copolymers. Polyacrylamide and copolymers of acrylamide containing at least about 70% of acrylamide combined in the polymer molecule have been found to have excellent properties for the

Table I
EXAMPLES 5–10

| Example | Monomer | Liquid Nonsolvent Medium | Dispersant | Percent (Based on Weight of Nonsolvent) | Percent Polymer Based on Monomer | Catalyst, Percent on Monomer | Conversion, percent | Mol Wt. $\times 10^6$ |
|---|---|---|---|---|---|---|---|---|
| 5 | Methacrylamide | n-heptane | Aerosol OT | 6 | 7 | Porofor N, 0.3 | 91 | 0.9 |
| 6 | do | do | do | 6 | None | do | 89 | 0.8 |
| 7 | Acrylamide | do | N-octadecyl di-sodium sulfo-succinate | 7 | 5 | Lauroyl peroxide, 0.1 | 93 | 1.3 |
| 8 | do | do | do | 7 | None | do | 90 | 0.9 |
| 9 | Acrylamide-Methacrylic acid (85/15) | Nujol | Aerosol IB [1] | 5 | 8 | Porofor N | 91 | 0.9 |
| 10 | do | do | do [1] | 5 | None | do | 86 | 0.6 |

[1] Diisobutyl sodium sulfosuccinate.

In ascertaining the molecular weight of the polymeric product, it is known that the molecular weight (M) of a polymer is related conveniently to intrinsic viscosity $[\eta]$ by an equation of the form: $[\eta]=kM^a$. Here $k$ and $a$ are constants whose value is determined by separate experiments in which molecular weight is measured by light scattering or by a similar absolute method. Information of this kind is given in various standard reference books on high polymers.

In the case of polyacrylamide, more detailed information on the relationship between intrinsic viscosity and molecular weight is available, i.e., $[\eta]=3.73\times 10^{-4}M^{0.66}$. This may be found in a publication of American Cyanamid Company, 30 Rockefeller Plaza, New York 20, N.Y., New Product Bulletin, No. 34, entitled Polyacrylamide, published in June 1955. The molecular weight of a polymer can be readily obtained once its intrinsinc visvosity is determined.

The polymeric and copolymeric acrylamides prepared by the process of the present invention ordinarily have a molecular weight (weight average molecular weight) in excess of 50,000. Generally, the molecular weight is within the range of about 200,000 and 5,000,000. Molecular weights of other polymers will vary depending on such factors as monomer structure and polymerization temperature.

It will be understood by those skilled in the art that our invention is not limited to the specific details that are given by way of illustration in providing the foregoing examples. Thus, various other monomers which have the characteristic of being solid at room temperature, which have a melting point in excess of about 35° C. which are readily polymerizable with free radical various uses set forth in the aforementioned Bulletin on polyacrylamide. For instance, the invention provides compositions which can be extruded or otherwise shaped to form useful articles of manufacture. The compositions of the present invention are also useful in warp-sizing and other textile-treating applications, paper treatment, as well as in adhesive compositions, ceramic binders, nitrocellulose lacquers, as components of rubber-based glues, in furniture glues which are capable of withstanding freeze-thaw cycles, and for various other purposes, examples of which have been given hereinbefore.

We claim:
1. In a process for preparing solid polymers which comprises polymerizing vinyl monomers having a melting point above 35° C. and selected from the group consisting of acrylamide, methylol acrylamide, methacrylamide, methylene bisacrylamide and mixtures of said acrylamides with acrylic acid and methacrylic acid with a free radical polymerization catalyst in the solid state and below their melting point, said polymerization being conducted in a non-aqueous medium, said medium being an inert liquid organic nonsolvent for said monomers and for said polymers and having a boiling point in the range of from about 50° C. to 110° C., the improvement which comprises conducting said polymerization in the presence of from about 0.5% to about 15% of solid powdered preformed polymer of said vinyl monomers suspended in said medium.

2. A method according to claim 1 wherein the monomer being polymerized is acrylamide.

3. A method according to claim 1 wherein the monomer being polymerized is methacrylamide.

4. In a process for preparing a solid copolymer of acrylamide-acrylic acid in a weight ratio respectively of at least 7:3 which comprises copolymerizing said acrylamide-acrylic acid mixture of monomers with a free radical polymerization catalyst in a solid state and below their melting point, said polymerization being conducted in a non-aqueous medium, said medium being an inert liquid organic nonsolvent for said monomers and for said polymers and having a boiling point in the range of from about 50° C. to about 110° C., the improvement which comprises conducting said polymerization in the presence of from about 0.5% to about 15% of solid powdered preformed polymer selected from the group consisting of homopolymers and copolymers of acrylamide and acrylic acid and suspended in said medium.

References Cited in the file of this patent

Mesrobian et al.: J. Chem. Phys. 22, 565–6 (1954).
Hohenstein et al.: Polymerization of Vinyl Derivatives in Suspension—I, pages 291–294, 300, India Rubber World, vol. 110 (June 1944).
Bovey: Emulsion Polymerization, pages 290–296, 336–338, Interscience Pub. (1955).